March 26, 1935.  R. B. RATHBUN  1,995,648
HIGH TEMPERATURE FILTERING
Filed June 25, 1931  2 Sheets-Sheet 2
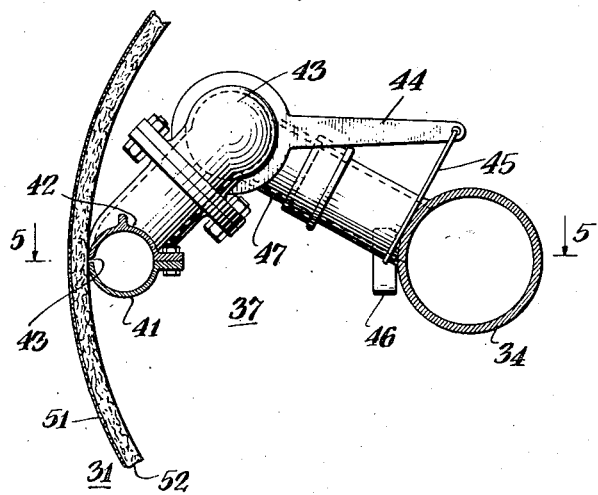
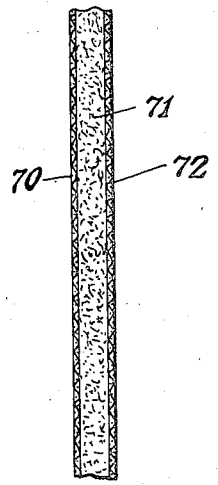
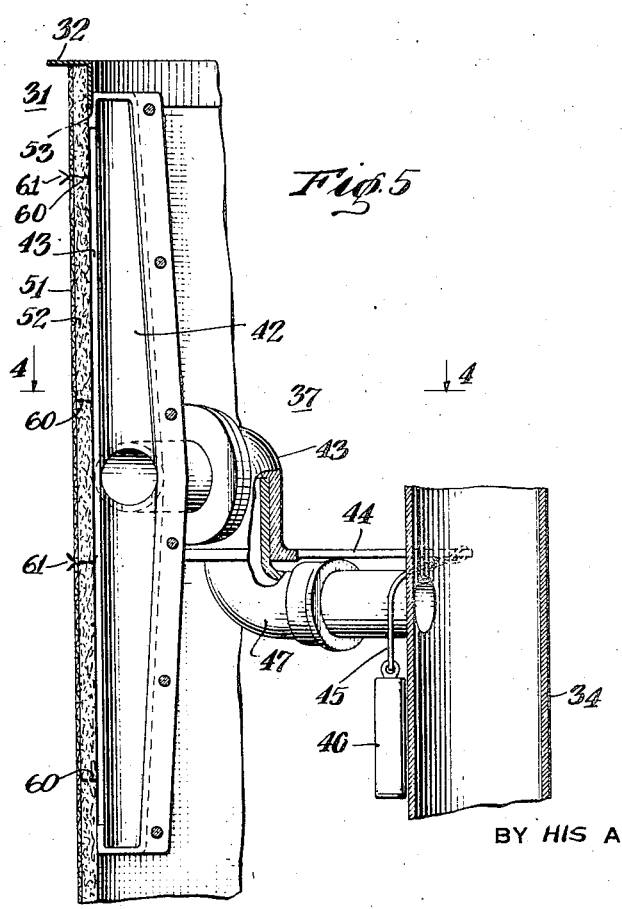
INVENTOR
Ross Buxton Rathbun
BY HIS ATTORNEYS
Austin & Fix Patented Mar. 26, 1935

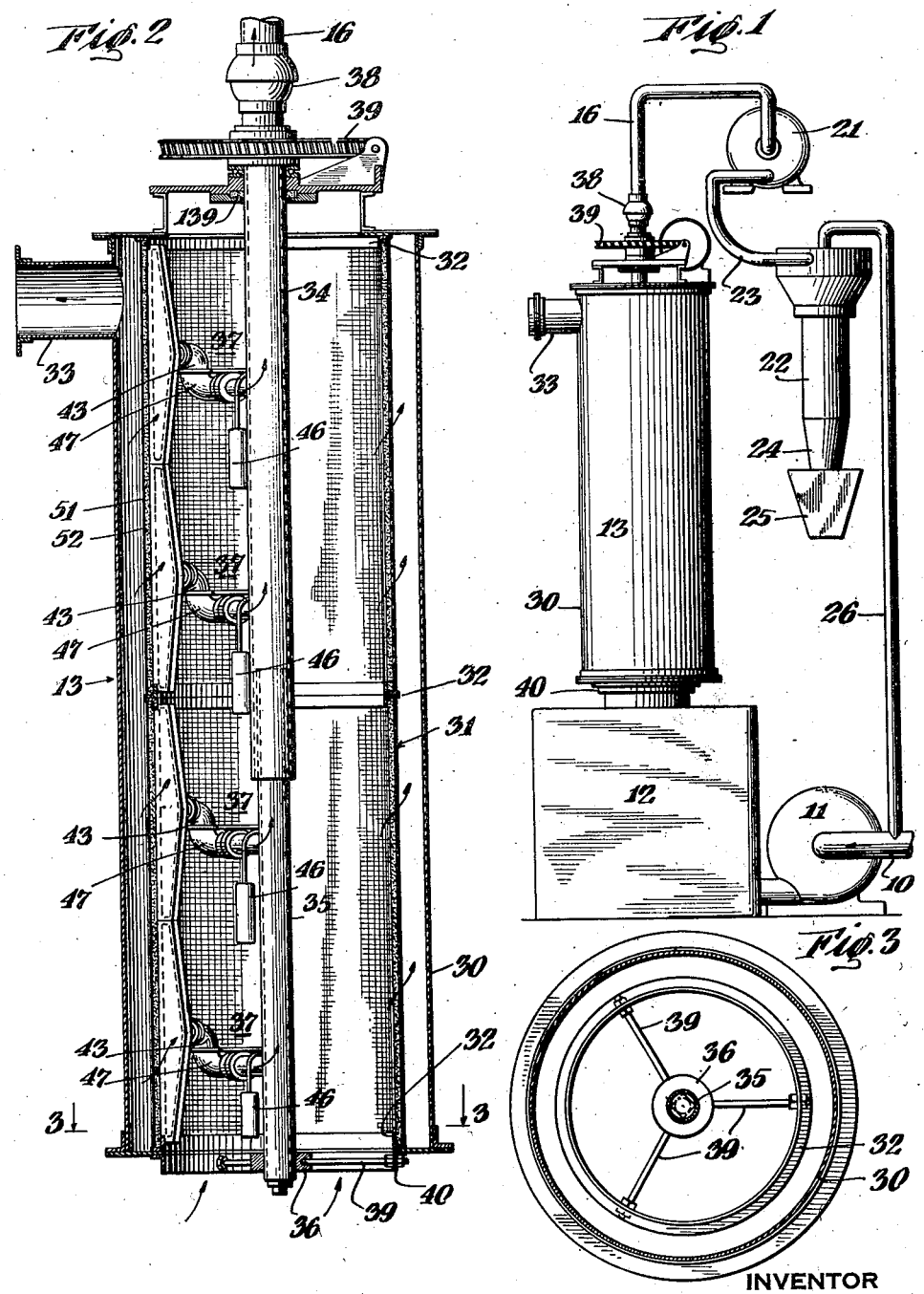

1,995,648

UNITED STATES PATENT OFFICE 1,995,648

HIGH TEMPERATURE FILTERING

Ross Buxton Rathbun, El Paso, Tex., assignor to American Smelting and Refining Company, New York, N. Y., a corporation of New Jersey Application June 25, 1931, Serial No. 546,811

9 Claims. (Cl. 183—61)

The invention relates to the separation of solids from gases, and more particularly to the separation of fume from the gases in which it is suspended, resulting, for instance, from metallurgical processes.

According to one form which the invention may assume, the filtering medium may comprise a fibrous material capable of withstanding high temperatures and may be supported by one or more suitable wire screens. As examples, this filtering medium may be mineral wool, steel wool, glass wool, sand, pulverized coke or the like.

The filtering medium may be made in the form of a flat sheet or in the form of a cylinder and may be arranged either vertically or horizontally. In the case of use with metallurgical processes, the filtering medium may be made up in a manner similar to the usual bags now used in bag houses.

It is preferable to provide a filter medium of a single screen with the fibrous material secured to one side thereof and to remove the deposited fume from the filtering medium by firmly pressing one or more suction heads against the fibrous material side of the filter medium locally, and moving these heads over the surface of the filter medium. The fume and comparatively small amount of gas drawn by the suction heads may be lead to a suitable separating device when the fume may be recovered.

In the latter construction, if desired, a central rotary conduit may be provided for each bag. Each conduit may have a plurality of suction heads, preferably arranged in line and extending the length of the bag. Tracks may be provided for guiding the suction heads to prevent them from digging into the material of the filtering medium.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 illustrates diagrammatically a system for practicing the invention;

Fig. 2 is an enlarged section through a single filter unit;

Fig. 3 is a bottom view of Fig. 2;

Fig. 4 is an enlarged detail of the bag and suction head taken on the line 4—4 of Fig. 5;

Fig. 5 is a section on the line 5—5 of Fig. 4;

Fig. 6 is a detail illustrating a modified form of bag using two screens.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, and more particularly to the Figs. 1 and 2, the flue or conduit 10 leads the gas carrying the fume from a suitable flue which may receive the material as the product of a metallurgical process. A blower 11 may force the fume and gas into a header 12 which in turn delivers it to one or more filtering units, indicated by 13. The filtered gas passes out of the unit 13 through pipe 33 and may be subject to further treatment or may be wasted, as desired. The fume collected passes out through pipe 16, being sucked by pump 21 and delivered to separator 22 by pipe 23. The separator 22 may be of the cyclone type having a conical portion 24 and the fume may be deposited in the receptacle 25. If desired, the gas, which may contain unseparated fume, may be re-cycled by the pipe 26 into the supply conduit 10, forming a closed circuit. If desired, the filtering unit 13 may be placed under suction by omitting the blower 11 and placing a suction blower in communication with the outlet pipe 33.

Referring now to Fig. 2, the unit 13 comprises a cylindrical shell 30 which supports a bag 31 through suitable supporting members some of which are indicated by 32. The bag 31 may be made up of any desired filtering medium, but is preferably composed of suitable fibrous material, indicated by 52, secured to an outer supporting screen 51 (see Figs. 4 and 5) as hereinafter described more in detail.

Supported within the bag is a rotary conduit made up of sections 34 and 35 suitably secured together so as to rotate together. This conduit is driven by a gear 39 and connects with stationary pipe 16 through a suitable swivel coupling 38. The lower end of conduit section 35 is rotatably supported in a bearing 36 held in position by radial stays 39 secured to structural member 40.

Secured to the conduit sections 34 and 35 are a plurality of suction heads indicated by 37 which rotate with the sections 34 and 35 to remove the deposited fume from the bag.

Referring now to Figs. 4 and 5, each suction head may comprise elongated half sections 42 and 41 suitably bolted together and having a long, narrow slot 43 disposed adjacent the bag 31. The head is secured to a fitting 43 which swivels upon a second fitting 47 which is secured to the rotary conduit 34 or 35, as the case may be.

For yieldably and firmly pressing the head against the bag, a lever 44 is secured to the fitting 43 and a weight 46 is secured to lever 44 by a strand 45 passing over the conduit, as illustrated. It will be noted that the section 34 is sealed at 139 against passage of gas through the top wall of shell 30.

To prevent the individual heads 37 from digging into the filtering medium 52, each head rides upon a circular track formed by the structural members 32 which support the filtering medium. If desired, the end of the head which bears on the track 32 may be cut away slightly to form a recess 53 (Fig. 5) to place the suction groove 43 in closer relation to the filtering medium.

The filter material 52 may be any material which performs the desired function and may be, for example, mineral wool, steel wool, or other material, depending upon the particular temperatures operated under and the chemical composition of the gas and fume. Successful filtering depends upon the denseness of the matting and successful cleaning by the vacuum heads depends upon the thinness of the filtering medium. To meet both requirements, the steel wool is first finely shredded and then passed between steel rolls, such as tinner's rolls, to compress the material. The compressed fibers are then suitably stitched together with wire stitching, indicated by 60, and the resulting mat is then secured to the supporting screen 51, as by tying at spaced intervals, indicated by 61 (see Fig. 5).

The compression is necessary because a loose matted bed of about two inches in thickness (for example) of steel wool would not filter clean until its internal structure became well filled with fume. Then, when the vacuum nozzle is applied for cleaning, the resistance of the long path straight through the filter mass would be so great that there would be a tendency for gas to be sucked in at the sides of the nozzle through a comparatively shallow stratum. However, if the two inch bed of matted fibers is passed through these rolls several times, it may be compressed to a thickness of about ¼ inch, making its denseness similar to that of the heavy twill woolen bag used recently in bag house practice. It then becomes suitable both for good filtering and for effective vacuum cleaning.

Referring now to Fig. 6, in this modified construction the two screens are indicated by 70 and 72 and the filter material by 71. This may be any material which performs the desired function and may be, for example, mineral wool, steel wool, sand, pulverized coke, etc.

The direct contact between the filter medium 52 and the suction heads has the advantage of reducing the amount of gas drawn in by the suction heads with the dust coating and provides more effective cleaning since the suction head gains a more intimate relation to the filtering medium.

It is thought that the operation of the invention will be apparent from the description and drawings, but attention is called to copending application Serial No. 514,417, filed February 9, 1931, which has matured into Patent No. 1,944,267, dated Jan. 23, 1934, and to copending application Serial No. 532,254, filed April 23, 1931, which has matured into Patent No. 1,944,268, dated Jan. 23, 1934, for a more detailed description of the operation of vacuum cleaning of filter bags. It suffices to say that the gas entering the bottom of the bag in Fig. 2 passes through the filtering medium 31 into the outer shell 30 and thence is lead out through pipe 33. The fume is deposited upon the inside surface of the filtering medium 31 whence it is removed by the rotary suction heads 37 and the comparatively concentrated mixture of fume and gas is lead to the separator 22.

An advantage of the present invention is that it is possible to operate under temperatures in excess of the temperatures which ordinary fabric of woolen bags can stand and with gases and fumes which have a corrosive action on the old fashioned materials. The present invention operates very well with temperatures above 200° F. Furthermore, due to the absence of the interstices which are present in ordinary cloth bags, a higher filtering rate for a given pressure is obtained.

Tests have shown that where the sulphuric acid content of the dust or fume is sufficient to prevent it from flowing freely, the filter medium quickly plugs up. However, where the dust is quite dry, as in the majority of cases, a very high filtering rate with practically perfect cleaning is obtained.

It is known that Cottrell precipitators may function satisfactorily on certain gases so long as the temperature is sufficiently high for ionization, say, about 700° F. There is a range of approximately 500° F. below this point where the Cottrell process becomes entirely inoperative, and in which the present process functions perfectly. In fact, the present process works satisfactorily at all temperatures from ordinary temperatures to those at which the metal structure fails.

It will be understood that the operation of the suction heads over the filtering medium may be either continuous or intermittent, depending upon operating conditions. If the operation is continuous, the advantages of constant operating conditions are obtained. The head on the gas supply may be ararnged at its most efficient volume and likewise the amount of suction applied to the suction heads. Furthermore, the main blower 11 does not have to be stopped while the fume is being removed from the bag and the bags are kept cleaner, resulting in larger handling capacity for the same size bags.

While certain novel features of the invention have been disclosed and are pointed out in the annexed claims, it will be understood that various omissions, substitutions and changes may be made by those skilled in the art without departing from the spirit of the invention.

What is claimed is:

1. In filtering apparatus, a bag structure comprising a cylindrical filter medium, means for supporting said bag structure including a plurality of annular members, a plurality of elongated suction heads disposed in line arranged along the length of the bag structure, said annular supporting members providing tracks for said suction heads, a central rotary conduit, branch conduits connecting said rotary conduit and suction heads, means for yieldably pressing said suction heads against the bag structure and means for driving said rotary conduit.

2. In filtering apparatus, a bag structure comprising a cylindrical screen, filter material secured to said screen, means for supporting said bag structure including a plurality of annular members, a plurality of elongated suction heads disposed in line and arranged along the length of the bag structure, said annular supporting members providing tracks for said suction heads, a central rotary conduit, branch conduits connecting said rotary conduit and suction heads, means for yieldably pressing said suction heads against the bag structure and means for driving said rotary conduit.

3. In cleaning apparatus, a cylindrical filter medium, a central rotary conduit therein, a cleaning head extending lengthwise of the filter medium, a first branch conduit connected to said central rotary conduit, a second branch conduit connected to said head, means for swiveling said branch conduits together, a flexible strand connected to said second branch conduit and a weight on said strand, so arranged that said weight acts to yieldably hold said head against said filter medium.

4. In cleaning apparatus, a cylindrical filter medium, a central rotary conduit therein, a pneumatic cleaning head extending lengthwise of the filter medium, a first branch conduit connected to said central rotary conduit, a second branch conduit connected to said head, means for swiveling said branch conduits together, an arm on said second branch conduit, a flexible strand connected to said arm and running over said first branch conduit, and a weight on said strand to yieldably hold said head against said filter medium.

5. In a filter bag, a cylindrical support, a filter medium secured to the inside of said support, annular tracks also secured to the inside of said support, upper and lower central bearings, a central conduit journalled in said bearings, a plurality of suction heads riding on said annular tracks and having a tight connection with said filter medium, said suction heads being connected to said central conduit.

6. In a unitary bag assembly, a cylindrical support for the bag, a filter medium secured to the inside of said support, annular tracks also secured to the inside of said support, a top structure having a central bearing connected to the top of said bag support, a central bearing connected to the bottom of said bag support, a central conduit journalled in said bearings, driving apparatus for said conduit mounted on said top structure, a swivel joint connecting said central conduit and a source of suction, a plurality of suction heads riding on said annular tracks and having a tight connection with said filter medium, said suction heads being connected to said central conduit.

7. In a filter mechanism, a cylindrical filtering medium, a rotary cleaning member within said cylindrical medium, means yieldably pressing said member against said medium, circular tracks limiting the pressure of said member against said medium, and means to supply a fluid to be filtered to said medium.

8. In a filter, a cylindrical bag comprising an outer layer of supporting screen, a filter mat disposed inside said screen, said filter mat comprising a bed of loose matted steel wool compressed and felted sufficiently to give clean filtering action, but being sufficiently thin to permit effective vacuum cleaning, wire stitching supporting said mat and assisting in holding it together, fastening devices securing at spaced intervals said mat to said screen, means to pass the fluid to be cleaned through said bag from inside to out, a suction nozzle in direct contact with the steel wool, means to move said suction head relatively to said bag to remove the deposited particles therefrom, and means for applying a source of suction to said suction nozzle.

9. In a filter, a cylindrical bag comprising an outer open mesh supporting member, a filter mat disposed inside said supporting member, said filter mat comprising a bed of loose, matted steel wool compressed and felted to sufficient density to give clean filtering action, but being sufficiently thin to permit effective vacuum cleaning, wire for assisting in holding said mat together, fastening devices securing at spaced intervals said mat to said supporting member, means to pass the fluid to be cleaned through said bag from inside to out, a suction nozzle in direct contact with the steel wool, means to move said suction head relatively to said bag to remove the deposited particles therefrom, and means for applying a source of suction to said suction nozzle.

ROSS BUXTON RATHBUN.